United States Patent

[11] 3,593,758

| [72] | Inventor | Vladimir Grigorievich Sergiev<br>Ulitsa 4 Parkovaya, 26, Ku. 9, Moscow,<br>U.S.S.R. |
|---|---|---|
| [21] | Appl. No. | 791,053 |
| [22] | Filed | Jan. 14, 1969 |
| [45] | Patented | July 20, 1971 |

[54] MACHINE FOR MAKING SINGLE-TURN WIRE LOOP WINDING SECTIONS AND PLACING THEM INTO GROOVES OF AN ELECTRICAL MACHINE
1 Claim, 4 Drawing Figs.

[52] U.S. Cl.................................................... 140/1,
140/92.1, 29/205 D
[51] Int. Cl.................................................... H02k 15/00
[50] Field of Search........................................... 140/1, 92.1,
92.2; 29/205

[56] References Cited
UNITED STATES PATENTS
Re. 16,823 12/1927 Apple........................... 29/205

| 2,290,381 | 7/1942 | Poole et al. .................. | 29/205 |
| 2,615,639 | 10/1952 | Collins ........................ | 140/1 |
| 2,631,362 | 3/1953 | Todd............................ | 29/205 |

Primary Examiner—Lowell A. Larson
Attorney—Waters, Roditi, Schwartz & Nissen

ABSTRACT: A machine is provided for making single-turn wire loop sections of the windings of electrical machines and for placing these sections into the grooves of an armature part of an electrical machine. The machine comprises a mechanism for extending the sections and a mechanism for moving the end portions of the sections apart. Each of the mechanisms has an external cylinder and an internal cylinder disposed concentrically and mounted for rotation and axial displacement in relation to each other. The external cylinder of the mechanism which moves the end portions of the sections apart has an annular projection at the face end thereof adapted, in the course of movement apart of the end portions, to enter between the external and internal layers of the end portions of the sections placed into the grooves of the armature.

MACHINE FOR MAKING SINGLE-TURN WIRE LOOP WINDING SECTIONS AND PLACING THEM INTO GROOVES OF AN ELECTRICAL MACHINE

The present invention relates to machines for making single-turn wire loop sections of the windings of electrical machines and for placing these sections into semiclosed and closed grooves of the constituent parts of such electrical machines.

Known in the art are machines used for the above-mentioned purpose which comprise mechanisms for making (and extending) the wire sections and shaping the ends thereof, said mechanisms including pairs of concentrically disposed cylinders adapted for rotation in relation to each other (see, for example, the USSR Author's Certificate No. 125,610 issued to V. G. Sergiev).

However, machines of this known type do not provide for a high quality of the windings of electrical machines, made thereby, due to the nonuniformity of the tangential (or angular) spacing between the face end portions of adjacent winding sections and also by the impossibility of maintaining optimal radial spacing between the upper and lower end portions of the winding sections, which necessitates the use of additional insulation of the face end portions of the winding sections.

It is an object of the present invention to eliminate this disadvantage.

The main object of the present invention is to provide an improved machine for making single-turn wire loop sections of the windings of electrical machines and for placing the same into the grooves of such machines, which improved machine provides for uniform tangential (or angular) clearances between the front portions of adjacent sections and also for attainment of optimal radial clearance between the upper and lower layers of such sections.

This object is accomplished in a machine for making single-turn wire loop sections of the windings of electrical machines and for placing said sections into the grooves of a constituent part of an electrical machine, comprising a first mechanism for extending said sections and a second mechanism for moving the end portions of said sections apart, each one of said mechanisms including an external cylinder and an internal cylinder disposed concentrically and mounted for rotation in relation to each other, in which machine, according to the present invention, said cylinders of each one of said mechanisms are mounted for axial displacement in relation to each other, and said external cylinder of said first mechanism has an annular projection at the face end thereof, adapted, in the course of moving apart of the end portions, to enter between the external and internal layers of said end portions of said sections placed into said grooves.

In a preferred embodiment of the present invention, said annular projection is in the form of a detachable ring.

A machine embodying the present invention provides for uniformity of the tangential (angular) and radial clearances of the front portions of the windings of an electrical machine and obviates the need for additional insulation of said front portions of the winding, thus improving the overall cooling characteristics of the electrical machine.

The present invention will become better understood from the following detailed description of a preferred embodiment thereof, due reference being made to the accompanying drawing, in which.

Figure 1:
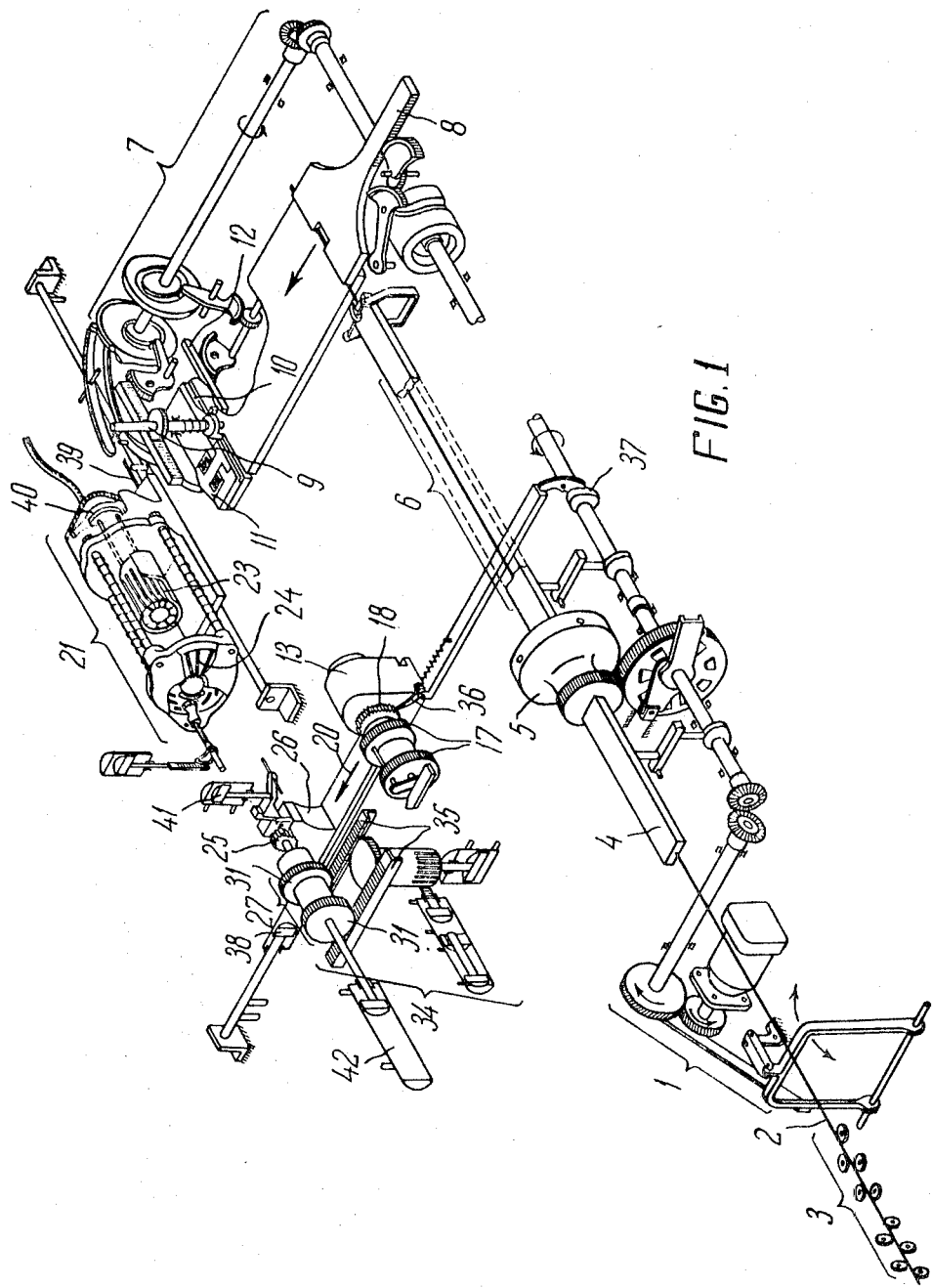
FIG. 1 shows schematically the operative connections between the mechanisms of a machine, embodying the invention.
Figure 2:
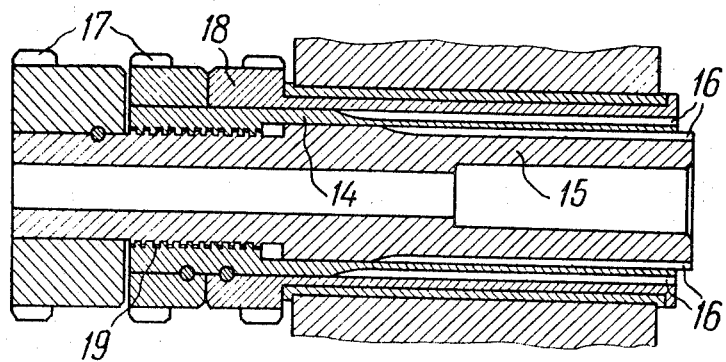
FIG. 2 shows a longitudinal sectional view of the mechanism for extending the wire loop sections.
Figure 3:
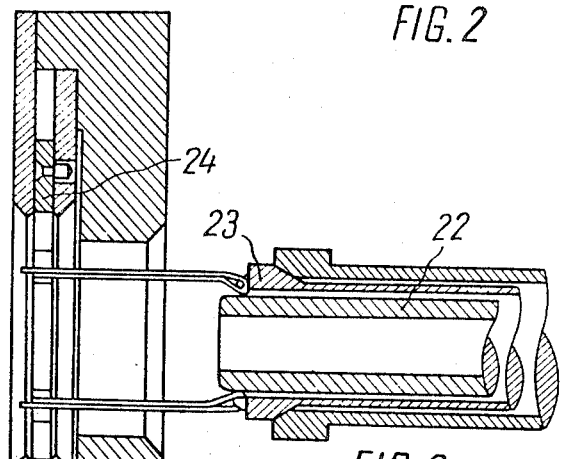
FIG. 3 shows a longitudinal sectional view of the mechanism for transferring the assembled sets of the wire loop sections.
Figure 4:
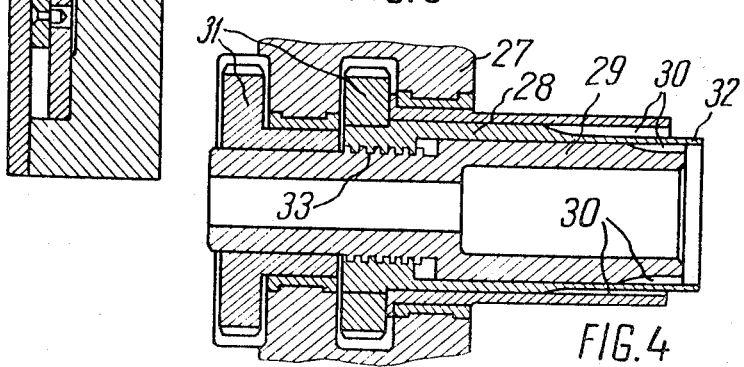
FIG. 4 shows a longitudinal sectional view of the mechanism for moving the end portions of the wire loop sections apart.

Referring now to the drawings, FIG. 1 shows schematically a machine for making single-turn wire loop sections of the windings of electrical machines and for placing the same in closed or semiclosed grooves of an armature of an electrical machine. The machine comprises the following mechanisms and parts: a mechanism 1 for intermittent stepwise feeding of a winding wire 2, including a crank unit and a system of levers which alternatively clamp and release the wire 2; a straightening device 3 for straightening the wire 2 as the latter is fed therethrough; a guide 4 for feeding the straightened wire; a mechanism 5 for cutting the wire and shaping the ends of the cut pieces, or blanks for the would be sections; a block 6 for guiding the severed blanks; a wire-bending and loop-shaping mechanism 7 actuated by cams mounted on the drive shaft of the machine through followers, levers, toothed gears, toothed racks and toothed segments, the mechanism 7 including a feeder plate 8 for advancing a blank to the bending position, a mandrel 9 about the end portion of which the wire blank is bent, a bending plate 10 effecting the bending of the blank and shaping the latter into an open loop, a shaping plate 11 for shaping the head portion of the loop and a pusher 12, a mechanism 13 for extending the wire loop sections, including two concentrically disposed cylinders, i.e. an external cylinder 14 (FIG. 2) and internal cylinder 15, both cylinders 14 and 15 having axially extending splines 16 equally angularly spaced about the respective peripheries thereof, the number of these splines 16 of each one of the two cylinders being equal to the number of the longitudinal grooves in an armature handled by the machine, each of the two cylinders being provided with a toothed rim 17 rigidly attached thereto, while the cylinder 14 additionally has a ratchet gear 18 also rigidly attached thereto (the cylinders 14 and 15 are interconnected by means of their respective helical threads 19, and the whole mechanism 13 for extending the wire loop sections is mounted on a carriage 20 (FIG. 1) mounted for reciprocation in a direction transverse to the axes of the cylinders 14 and 15); a mechanism 21 for transferring assembled sets of wire loop sections, including mandrel 22 (FIG. 3) of which the end portion can be received in the front portion of a set of sections, a collet 23 for clamping the set of sections and guide cams 25 for supporting the end portions of the sections while the latter are transferred into the grooves of the armature 25 (FIG. 1) being assembled, the armature being secured to a supporting device 26; a mechanism 27 for moving the end portions of the sections apart after the latter have been placed into the grooves of the armature 25, including two concentrically disposed cylinders, i.e. an external cylinder 28 (FIG. 4) and an internal one 29, both cylinders 28 and 29 having axially disposed splines 30 equally angularly spaced about the respective peripheries thereof, the numbers of these splines 30 of each one of the two cylinders being equal to the number of the grooves in the armature 25 to be assembled by the machine, each one of the two cylinders 28 and 29 being provided with a toothed rim 31 rigidly attached thereto, while the external cylinder 28 has additionally an annular projection 32 at the face end thereof, this annular projection 32 entering between the upper (the external) and the lower (the internal) layers of the end portions of the wire loop sections placed into the grooves of the armature 25, to support the upper layer of these end portions and to prevent their displacement toward the axis of the armature in the course of moving the end portions apart, the cylinders 28 and 29 being interconnected by means of their respective helical threads 33; and a mechanism 34 for effecting relative rotation of the above-mentioned cylinders, including toothed racks 35 for rotating in opposite directions the cylinders 14 and 15 of the mechanism 13 and the cylinders 28 and 29 of the mechanism 27.

The machine embodying the present invention operates, as follows:

The mechanism 1 (FIG. 1) for stepwise feeding of the winding wire 2 clamps by its jaws the wire, pulls it through the straightening device 3 and pushes the straightened wire through the guide 4 into the mechanism 5 which cuts the wire and compresses the ends of the wire blanks of a desired length, which this mechanism severs. Each severed blank, as the wire feeding continues, pushes the preceding blank through the channel in the guide block 6, whereby the blanks are fed in succession, one blank for each operating cycle of the feeding mechanism, into the recess in the face end of the plate 8 which is actuated from a cam on the operating shaft and, during the working stroke of its reciprocation, carries the blank in the direction indicated by the arrow in FIG. 1 to the work station where the blank is to be bent into a wire loop. After the blank arrives at the station, the mandrel 9 is lowered, and the bending plate 10 bends the blank about this mandrel 9. Thereafter, the reciprocating plate 11 shapes the head portion of the loop.

Then the mandrel 9 is raised to its initial position, and the pusher 12 thrusts the ready loop into the corresponding pair of the splines 16 of the cylinders 14 and 15 of the mechanism 13. In the initial position of the mechanism 13 the cylinders 14 and 15 have their face ends disposed in different planes, with the end of the internal cylinder 15 projecting a limited distance beyond the end of the external cylinder 14, while their splines 16 are radially aligned in pairs.

This disposal of the ends of these cylinders in different planes is responsible for the front ends of the winding sections acquiring asymmetrical shape, which is essential for ensuring uniform tangential clearances between the adjacent sections.

Prior to the introduction of the next successive loop into the splines of the cylinders 14 and 15, the cylinders are jointly rotated about their common axis through an angle corresponding to the angular spacing of the grooves in the armature 25 being assembled, by means of the ratchet gear 18 and the pawl 36 (FIG. 1) reciprocated by the cam 37 on the drive shaft. The above-described operation repeats itself, until all the splines 16 of the cylinders 14 and 15 of the mechanism 13 are filled with wire loops.

After all the pairs of the splines 16 are filled, the mechanism 13 is driven bodily by the hydraulic cylinder and piston arrangement 38 in a direction indicated by the arrow in FIG. 1, to the position in which the winding sections are to be extended and placed into the grooves of the armature 25. Then the mechanism 34 for effecting the rotation of the cylinders 14 and 15 is raised into its working position, and its toothed racks 35 mesh with the respective toothed rims 17 of the cylinders. The racks 35 are then driven in opposite directions, effecting the rotation of the cylinders 14 and 15, also in opposite directions, through an angle which is somewhat greater than that needed in accordance with the winding pattern of the armature. Simultaneously with the relative rotation of the cylinders 14 and 15, the threaded connection 19 (FIG. 2) therebetween effects their relative axial displacement, whereby the set of the winding sections received in the splines of the cylinders is correspondingly extended. After this rotation of the cylinders 14 and 15 is completed, the cylinders are rotated back by an angle equal to the difference between the angle of their actual rotation in the above-described forward direction and the one needed in accordance with the winding pattern, whereby the contact tension between the cylinders and the bends of the wire sections is relieved, and the set of the sections can be easily withdrawn from the splines of the cylinders.

After the winding sections have been extended in the above-described manner, the hydraulic piston and cylinder arrangement 39 drives the section transfer mechanism 21 toward the mechanism 13, and the mandrel 22 (FIG. 3) enters into the front end of the set of the sections, while the abutments of the collet 23 are received between the head portions of the sections, whereafter the collet 23 is radially compressed by means of the hydraulic cylinder and piston arrangement 40 (FIG. 1), whereby its abutments engage the heads of the sections and press them against the periphery of the mandrel 22.

Then the transfer mechanism 21 is retracted a slight distance, for the wiring sections to project slightly from the splines 16 of the cylinders 14 and 15, whereafter the legs, or sides of the thus projected sections are received and retained in pairs between the guiding cams 24 which prevent any accidental displacement of the legs of the sections. Thereafter the mechanism is fully retracted to its initial position, and the racks 35 of the mechanism 34 are moved in directions opposite to those of their working stroke, whereby the cylinders 14 and 15 are also returned into their initial position.

Then the cylinder-rotating mechanism 34 is lowered back into its idle position, and the racks 35 clear the toothed rims 17 of the mechanism 13. The latter is returned to its section-receiving position, where wire loops for the successive set of winding sections are loaded one by one into the splines 16, whereas the device 26 mounted on the same carriage 20 with the mechanism 13 is moved bodily, together with the armature 25 carried thereby, to the position of extending the sections and placing them into the grooves of the armature. In this position the armature 25 is automatically retained by a lever system actuated by the hydraulic cylinder and piston arrangement 41.

Now the mechanisms of the machine herein described acquire exactly the respective positions shown in FIG. 1.

Then the hydraulic cylinder and piston arrangement 42 drives the mechanism 27 toward the armature 25, until the annular projection 32 of the external cylinder 28 (FIG. 4) of this mechanism bears against the front end of the armature. The mechanism 27 is adapted for moving the end portions of the winding sections apart, while the thrust of the annular projection 32 against the face of the armature prevents the S-shaped sleeve (the groove insulation) of the armature from being displaced in the course of the movement of the winding sections into the grooves of the armature.

In the initial position of the mechanism 27, the cylinders 28 and 29 are so disposed that their front ends lie in different radial planes, with the extremity of the internal cylinder 29 projecting a limited distance beyond the front end of the external cylinder 28, while their splines 30 are radially aligned in pairs. As has been already explained in connection with the mechanism 13, the disposal of the ends of the cylinders in different planes provides for uniform tangential clearances of both the upper and the lower ends of the winding sections. Moreover, the provision of the annular projection 32 at the face of cylinder 28 ensures that during the operation of the moving apart of the ends of the sections, an optimal radial clearance is maintained between the upper and the lower layers of the ends of the sections.

The section transfer mechanism 21, while being moved toward the armature 25, drives the winding sections constituting the set simultaneously into all the grooves of the armature, and the end portions of the upper legs, or sides of the sections, after having passed through the grooves of the armature 25, are received in the splines 30 of the external cylinder 28 (FIG. 4), while the ends of the lower legs of the sections are received in the splines 30 of the internal cylinder 29. As the section transfer mechanism 21 passes through an intermediate point of its working travel, the guiding cams 24 (FIG. 3) are retracted radially to relieve the winding sections for their final placement inside the grooves.

After the sections of the winding have been placed into the grooves of the armature 25, the cylinder-rotating mechanism 34 (FIG. 1) is again driven into its raised position, and its racks 35 mesh with the respective toothed rims of the two cylinders of the mechanism 27 which is at this moment somewhat retracted into a position corresponding to the beginning of moving apart of the ends of the winding sections.

Then the racks 35 are driven longitudinally in opposite directions, thus effecting the forward rotation of the respective cylinders 28 and 29 (FIG. 4), also in opposite directions, through an angle which is slightly in excess of the angle needed for a desired winding pattern, while with the cylinders 28 and 29 rotating in the opposite direction, the threaded connection 33 therebetween effects their relative axial displacement, whereby the end portions of the sections of the winding are shaped in a desired way. Simultaneously, the mechanism 27 is bodily driven toward the armature 25, which also assists in the shaping of the ends of the sections.

After the above-described forward rotation of the cylinders is completed, the cylinders 28 and 29 are driven in reverse through an angle equal to the above mentioned excess amount, thus relieving the contact tension between the bends of the sections and the cylinders, whereby the sections can be easily removed from the splines of the cylinders.

After the operation of moving the ends of the winding sections apart is completed, the mechanism 27 is retracted by a limited distance to release the ends of the sections; the cylinder-rotating mechanism 34 drives its racks 35 to their initial position, whereby the cylinders 28 and 29 are also returned to their initial positions. Then the mechanism 34 is lowered bodily, and the racks 35 clear the toothed rims 31 of the mechanism 27; simultaneously, the collet 23 of the section transfer mechanism 21 releases the heads of the sections. Thereafter, the mechanisms 21 and 27 are returned into their respective initial position. The assembling of the winding of the armature 25 is thus completed.

The machine is so constructed, that at this moment the cylinders 14 and 15 of the mechanism 13 have their splines already filled with the new mounted of wire loops. Then the mechanism 13 is again driven to the position of extending the sections and placing them into the grooves of the successive armature, while the already-assembled armature 25 which is supported by the device 26 mounted on the same carriage as the mechanism 13, leaves the working zone of the machine and can be removed by the operator of the machine, who can then put the successive armature onto the device 26.

Thereafter, the above-described operation of the machine repeats itself.

A machine embodying the present invention can be used for making and assembling the single-turn wire loop sections of the windings of an electrical machine of any kind, and, among other applications, such machine can be used in a mechanized production line for assembling the starting motors for internal combustion engines.

The sequence of operations carried out by a machine embodying the present invention makes it possible to embrace in a single automatically performed operating cycle the full set of steps of applying the winding to an armature having semiclosed or closed grooves, and to perform this full set of steps in a single machine, thus providing for a considerable reduction of the floor space requirements of the corresponding production shops.

What I claim is:

1. A machine for making single-turn wire loop winding sections and placing them into grooves in an electrical machine, said machine comprising a first mechanism for extending said sections and a second mechanism for moving end portions of said sections apart, each of said mechanisms including an external cylinder and an internal cylinder, said cylinders being mounted for relative rotation, each one of said cylinders having axially extending splines equally angularly spaced about the periphery thereof, said splines being adapted to receive sets of blanks for said sections, said two cylinders of each of said first and second mechanisms being threadably connected to each other whereby their relative rotation results in their relative axial displacement, said internal cylinders of said mechanisms in the initial operating positions thereof having end portions projecting beyond the adjacent end portions of the respective ones of said external cylinders, whereby the projecting external and internal end portions of front portions of said sections have different lengths and are positioned, as a result of the relative axial displacement of said cylinders, with a uniform clearance between the external and internal portions of the front portions of the winding made by said sections, said external cylinder of said second mechanism including an annular projection at the front end portion thereof, said projection being adapted to enter, in the course of movement apart of said end portions, between the external and internal portions of the front portions of the winding made by said sections, in order to maintain a desired radial clearance therebetween.